US012331660B1

(12) United States Patent
Schubert et al.

(10) Patent No.: US 12,331,660 B1
(45) Date of Patent: Jun. 17, 2025

(54) VANE ASSEMBLIES WITH OVERLAPPING BAND COUPLINGS IN GAS TURBINE ENGINES

(71) Applicant: Rolls-Royce North American Technologies Inc., Indianapolis, IN (US)

(72) Inventors: Christopher J. Schubert, Indianapolis, IN (US); Robert W. Heeter, Indianapolis, IN (US); Jonathan M. Rivers, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/653,478

(22) Filed: May 2, 2024

(51) Int. Cl.
*F01D 9/04* (2006.01)

(52) U.S. Cl.
CPC .......... *F01D 9/041* (2013.01); *F05D 2240/12* (2013.01)

(58) Field of Classification Search
CPC ........................................................ F01D 9/041
See application file for complete search history.

(56) References Cited

U.S. PATENT DOCUMENTS

| | | | | |
|---|---|---|---|---|
| 4,832,568 | A * | 5/1989 | Roth | F01D 9/042 415/189 |
| 5,846,050 | A * | 12/1998 | Schilling | F01D 9/04 415/209.2 |
| 7,086,831 | B2 | 8/2006 | Harper | |
| 7,238,003 | B2 | 7/2007 | Synnott | |
| 7,448,851 | B2 | 11/2008 | Bolgar | |
| 8,398,366 | B2 | 3/2013 | Twell | |
| 8,899,914 | B2 | 12/2014 | Ring | |
| 8,920,112 | B2 | 12/2014 | Ring | |
| 9,790,809 | B2 | 10/2017 | Dube | |
| 10,451,082 | B2 | 10/2019 | Freeman | |
| 10,738,634 | B2 * | 8/2020 | Lamson | F01D 5/225 |
| 10,934,871 | B2 * | 3/2021 | Freeman | F01D 11/005 |
| 11,788,429 | B2 | 10/2023 | Hall | |
| 11,828,197 | B2 * | 11/2023 | Heeter | F01D 9/042 |
| 11,852,037 | B2 | 12/2023 | Zecha | |
| 2016/0245102 | A1 * | 8/2016 | Freeman | F01D 11/08 |
| 2018/0094582 | A1 | 4/2018 | Rosenau | |
| 2018/0094605 | A1 | 4/2018 | Rosenau | |
| 2019/0093512 | A1 * | 3/2019 | Sippel | F01D 11/08 |
| 2019/0152618 | A1 * | 5/2019 | Zaccardi | F02C 7/24 |
| 2020/0355089 | A1 * | 11/2020 | Razzell | F01D 11/08 |
| 2021/0025282 | A1 * | 1/2021 | Wong | F01D 9/041 |
| 2023/0407755 | A1 * | 12/2023 | Surace | F01D 9/041 |
| 2024/0052779 | A1 | 2/2024 | Amadon | |

FOREIGN PATENT DOCUMENTS

| | | | | |
|---|---|---|---|---|
| DE | 102013205883 | A1 * | 10/2014 | F01D 11/18 |
| EP | 3450699 | A1 * | 3/2019 | B32B 18/00 |

* cited by examiner

*Primary Examiner* — Brian Christopher Delrue
(74) *Attorney, Agent, or Firm* — Barnes & Thornburg LLP

(57) ABSTRACT

A vane assembly adapted for a gas turbine engine includes a first vane segment that extends circumferentially about an axis and a second vane segment. The second vane segment includes a band that extends circumferentially about the axis and a plurality of vanes coupled to the band and extending radially from the band.

14 Claims, 10 Drawing Sheets

VANE ASSEMBLIES WITH OVERLAPPING BAND COUPLINGS IN GAS TURBINE ENGINES

STATEMENT REGARDING FEDERALLY SPONSORED RESEARCH OR DEVELOPMENT

Embodiments of the present disclosure were made with government support under Contract No. HQ0034-20-9-0012. The government may have certain rights.

FIELD OF THE DISCLOSURE

The present disclosure relates generally to gas turbine engines, and more specifically to vane assemblies of gas turbine engines.

BACKGROUND

Gas turbine engines are used to power aircraft, watercraft, power generators, and the like. Gas turbine engines typically include a fan assembly and an engine core having a compressor, a combustor, and a turbine. The fan assembly includes rotating blades that force air into the compressor, as well as potentially providing thrust via forcing air around the engine core through bypass ducts. The compressor compresses air drawn into the engine by the fan assembly and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines also typically include stator vanes ahead of, between, or aft of rotating blades in the fan assembly and the compressor. Damping of the stator vanes by providing small gaps and not being overly constrained prevent or avoid high stresses to the stator vanes. However, the stator vanes should not be too loose so as to interfere with the rotating blades or other components of the gas turbine engine. Current solutions require high complexity and cost along with slow assembly times.

SUMMARY

The present disclosure may comprise one or more of the following features and combinations thereof.

A vane assembly adapted for a gas turbine engine according to the present disclosure may comprise a first vane segment that extends circumferentially about an axis and a second vane segment. The second vane segment may have a band that extends circumferentially about the axis and a plurality of vanes coupled to the band and extending radially from the band. The first vane segment may be coupled to the second vane segment to mate a radially-outward surface of the band of the second vane segment with a radially-inward surface of the first vane segment to place the plurality of vanes of the second vane segment in a position to lie between an axially-forward surface of the first vane segment and an axially-aft surface of the band of the second vane segment so that the first vane segment and the second vane segment are damped.

In some embodiments, movement of the band relative to the first vane segment may be blocked in at least one of an axial, radial, or circumferential direction while minimal movement of the band relative to the first vane segment may be permitted in at least one of an axial, radial, or circumferential direction.

In some embodiments, the one or more vanes may extend radially inward from the vane segment. In some embodiments, the one or more vanes may extend radially outward from the vane segment.

In some embodiments, the band may extend circumferentially between a first end and a second end. In some embodiments, an internal angle between the first end and the second end may be between about 60° and about 180°.

In some embodiments, the first vane segment may include a second band and a second plurality of vanes coupled to the second band and extending radially from the second band.

These and other features of the present disclosure will become more apparent from the following description of the illustrative embodiments.

DETAILED DESCRIPTION OF THE DRAWINGS

Figure 1:
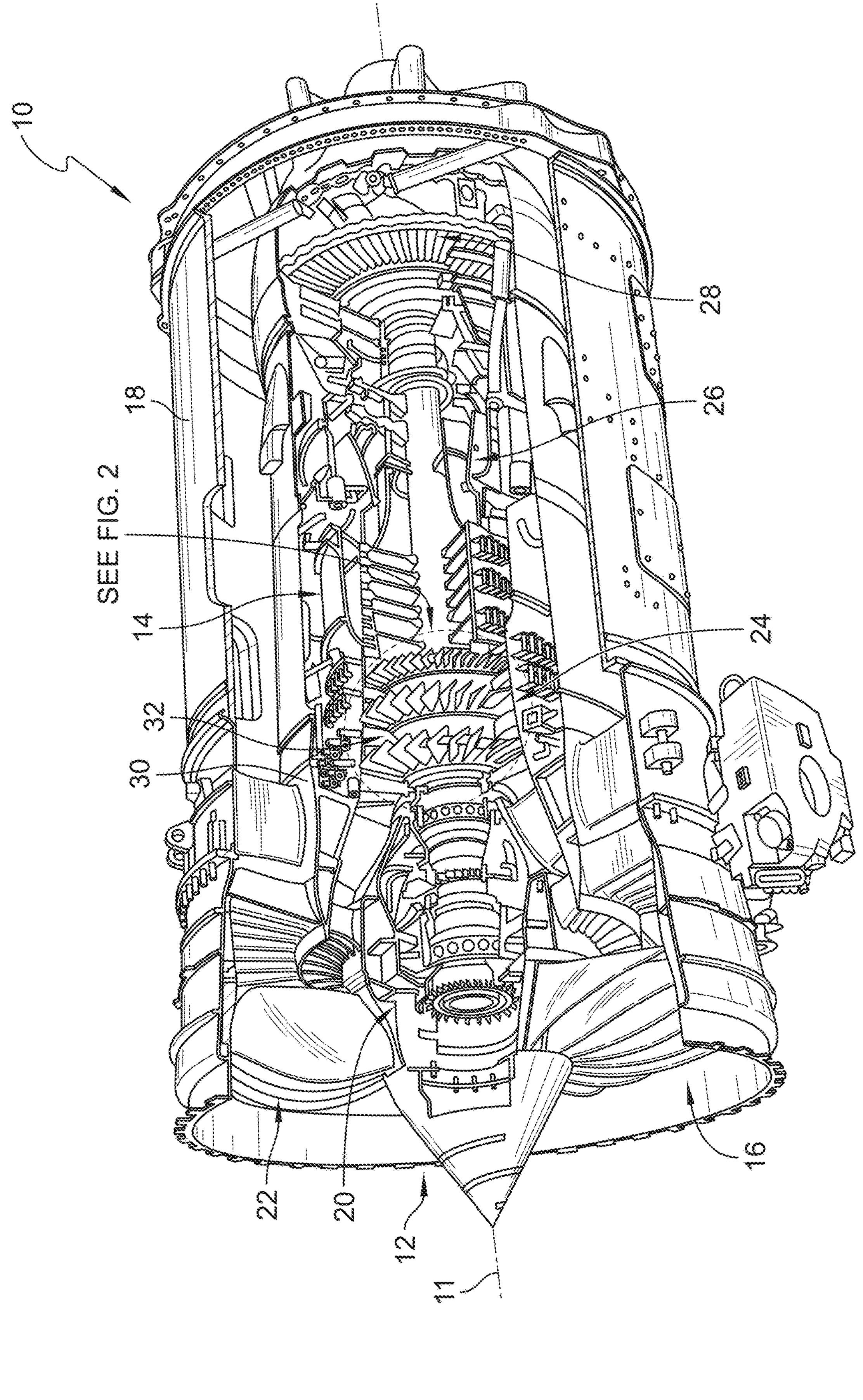
FIG. 1 is a cutaway view of a gas turbine engine that includes a fan assembly and an engine core having a compressor, a combustor, and a turbine, the compressor having a vane assembly in accordance with the present disclosure.

For the purposes of promoting an understanding of the principles of the disclosure, reference will now be made to a number of illustrative embodiments illustrated in the drawings and specific language will be used to describe the same.

A gas turbine engine 10 includes a fan assembly 12 and an engine core 14 as shown in FIG. 1. The fan assembly 12 provides thrust for propelling an aircraft coupled with the engine 10. The engine core 14 compresses air, mixes fuel with the air, and ignites the fuel to power the fan assembly 12.

The fan assembly 12 includes a fan rotor 16 and a bypass structure (duct) 18 as shown in FIG. 1. The fan rotor 16 includes a fan wheel 20 and a plurality of fan blades 22 that extend radially outward from the fan wheel 20. The fan rotor 16 rotates about a central axis 11 of the gas turbine engine 10 to generate thrust and propel the aircraft. The bypass structure 18 is arranged circumferentially about the central axis 11 and is radially outward of the fan rotor 16 to direct the air aft of the engine 10.

The engine core 14 includes a compressor 24, a combustor 26, a turbine 28, and a core casing 30 as shown in FIG. 1. The compressor 24 compresses and delivers air to the combustor 18. The combustor 26 then mixes fuel with the compressed air and ignites the fuel. The hot, high-pressure products of the combustion reaction in the combustor 26 are directed into the turbine 28 to cause the turbine 28 to rotate about the central axis 11 and drive the compressor 24 and the fan assembly 12. The core casing 30 extends circumferentially about the central axis 11 and is located radially inward of the bypass structure 18.

Figure 2:
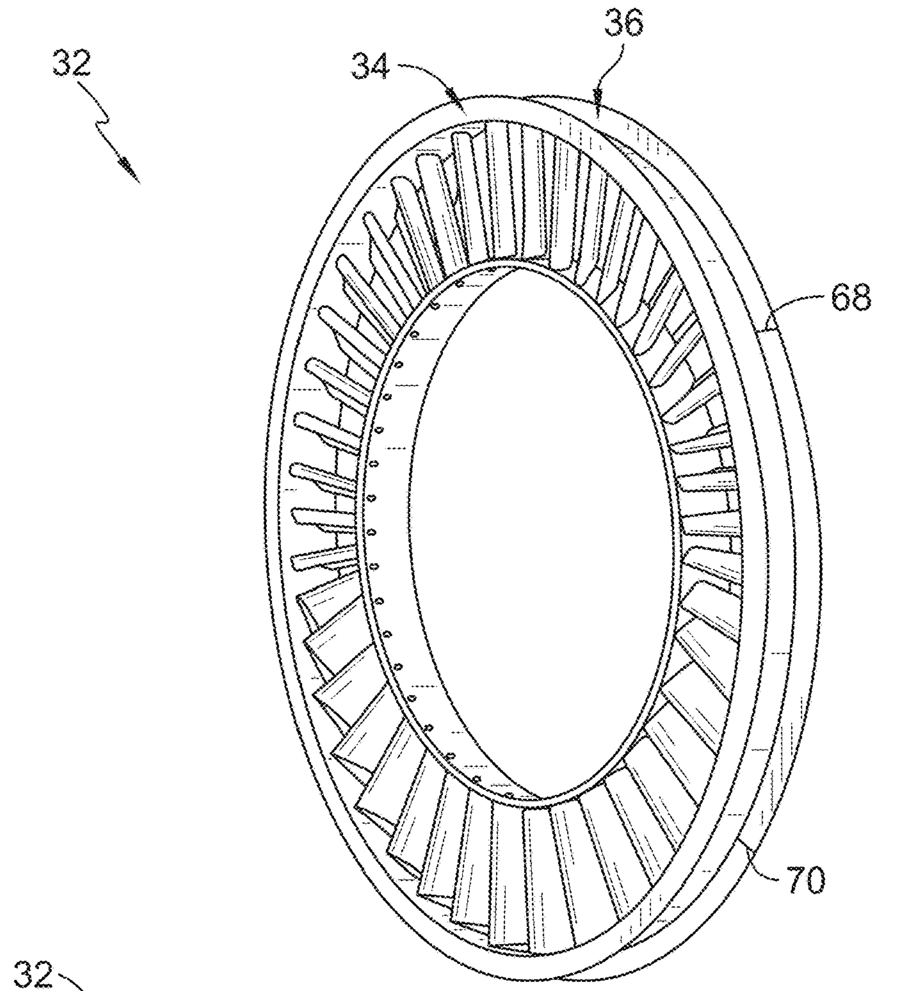
FIG. 2 is a perspective view of the vane assembly of FIG. 1 showing that the vane assembly includes a first vane segment extending circumferentially about an axis and a second vane segment extending circumferentially about the axis and located aft of the first vane segment.
Figure 3:
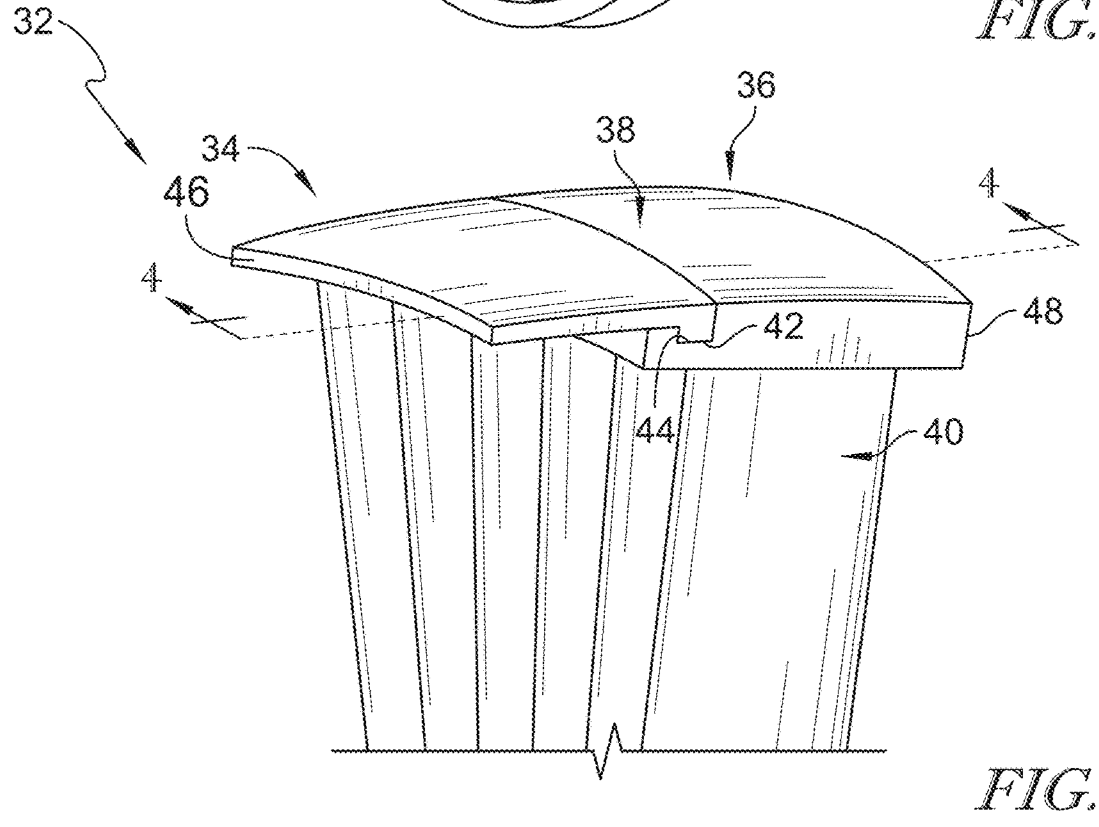
FIG. 3 is a perspective view of the vane assembly of FIG. 2 showing that the second vane segment includes a band that extends circumferentially about the axis and a plurality of vanes coupled to the band and extending radially inward from the band, and further showing that first vane segment includes a radially-inward surface that is mated with a radially-outward surface of the band of the second vane segment.

The gas turbine engine 10 further includes a vane assembly 32 adapted for use in the engine 10 as shown in FIGS. 1-3. The vane assembly 32 is configured to redirect airflow in various components of the engine 10. The vane assembly 32 includes a first vane segment 34 that extends circumferentially about the central axis 11 and a second vane segment 36 that extends circumferentially about the central axis 11 and is coupled to the first vane segment 34. In the illustrative embodiment, the vane assembly 32 is included in the compressor 24, the first vane segment 34 is a stator case or a stator in the compressor 24, and the second vane segment 36 is a stator of the compressor 24.

While reference is made throughout the disclosure of the vane assembly 32 being included in the compressor 24, the first vane segment 34 being a stator case or a stator and the second vane segment 36 being a stator, a person having ordinary skill in the art would appreciate that the vane assembly 32 of the present disclosure may be applied to various areas of the gas turbine engine 10. The vane assembly 32 of the present disclosure is used to connect static geometry in the gas turbine engine 10 that seeks damping without tightly constrained interfaces to assist with stress and dynamics in the gas turbine engine 10. The vane assembly 32 may have applications including, but is not limited to, stator outer or inner bands at their connections to another row or stage, to abradables above, forward, aft, or beneath them, or to their case. The vane assembly 32 of the present disclosure may also be applied to, but is not limited to, a fan assembly 12 such as a multi-stage fan with interstage or guide vanes, with a booster of a turbofan, turboprop, or turboshaft, or in an intermediate or high pressure compressor 24.

Figure 4:
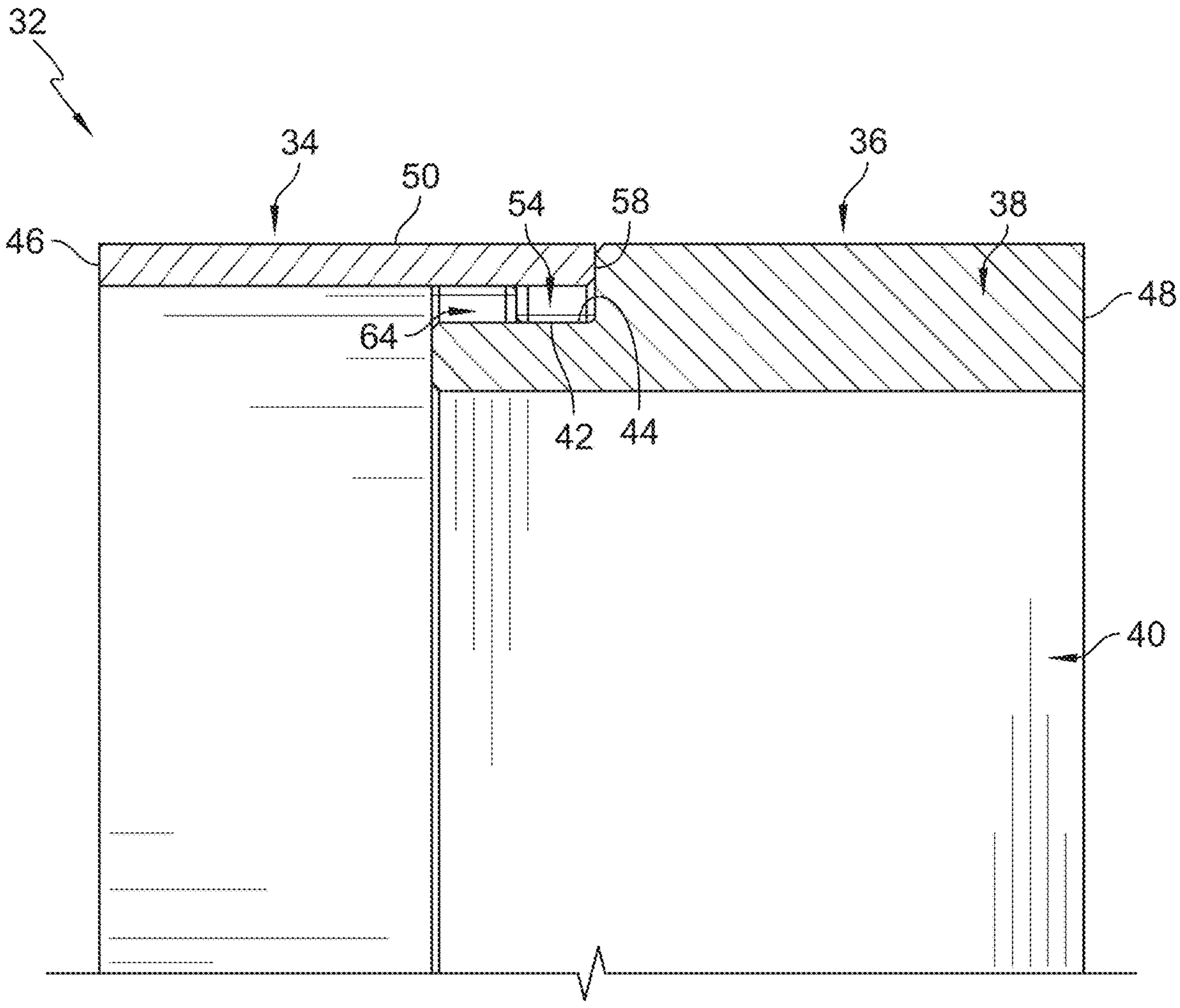
FIG. 4 is a section view taken along line 4-4 of the vane assembly of FIG. 3 showing that the plurality of vanes of the second vane segment lie between an axially-forward surface of the first vane segment and an axially-aft surface of the band of the second vane segment.
Figure 5A:
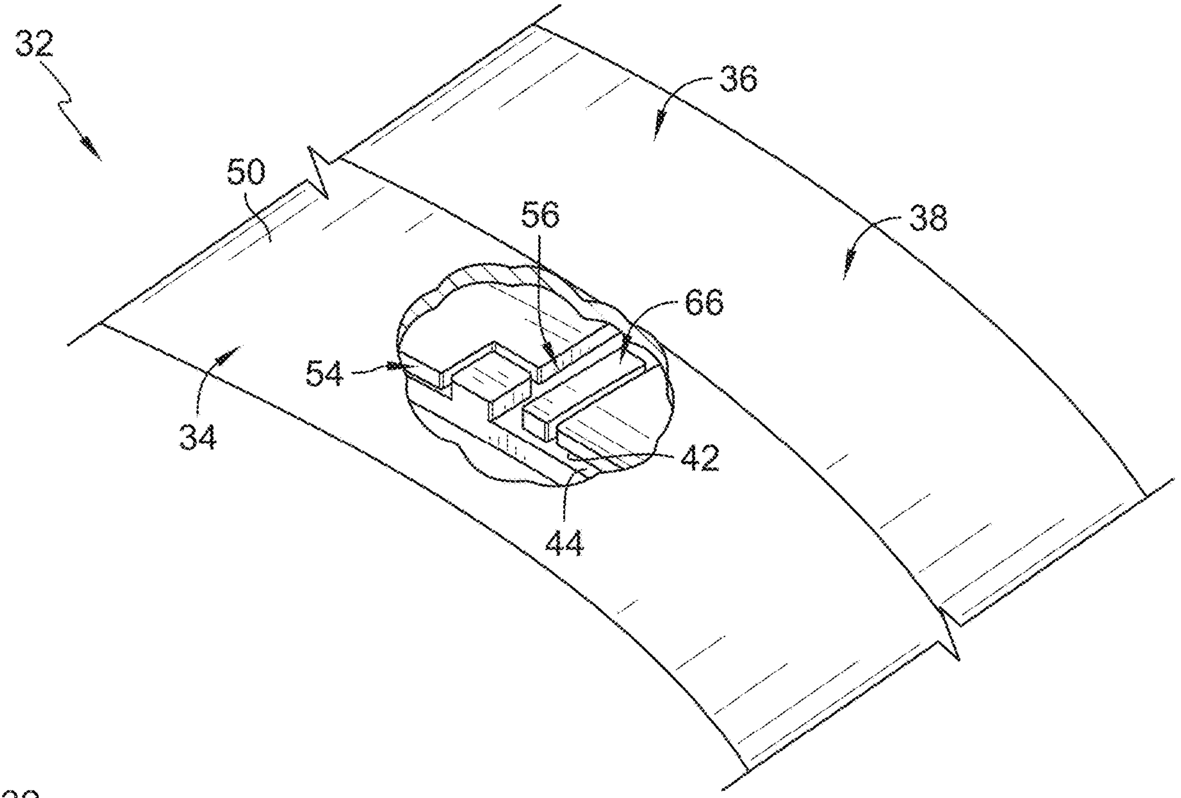
FIG. 5A is a cutaway view of the vane assembly of FIG. 3 showing that the first vane segment is formed to include an axially-extending slot and the band of the second vane segment includes a tab that is received in a circumferentially-offset notch formed from the axially-extending slot to mate the first vane segment with the second vane segment, the vane assembly further including a securing member received in the axially-extending slot to block circumferential movement of the tab.
Figure 5B:
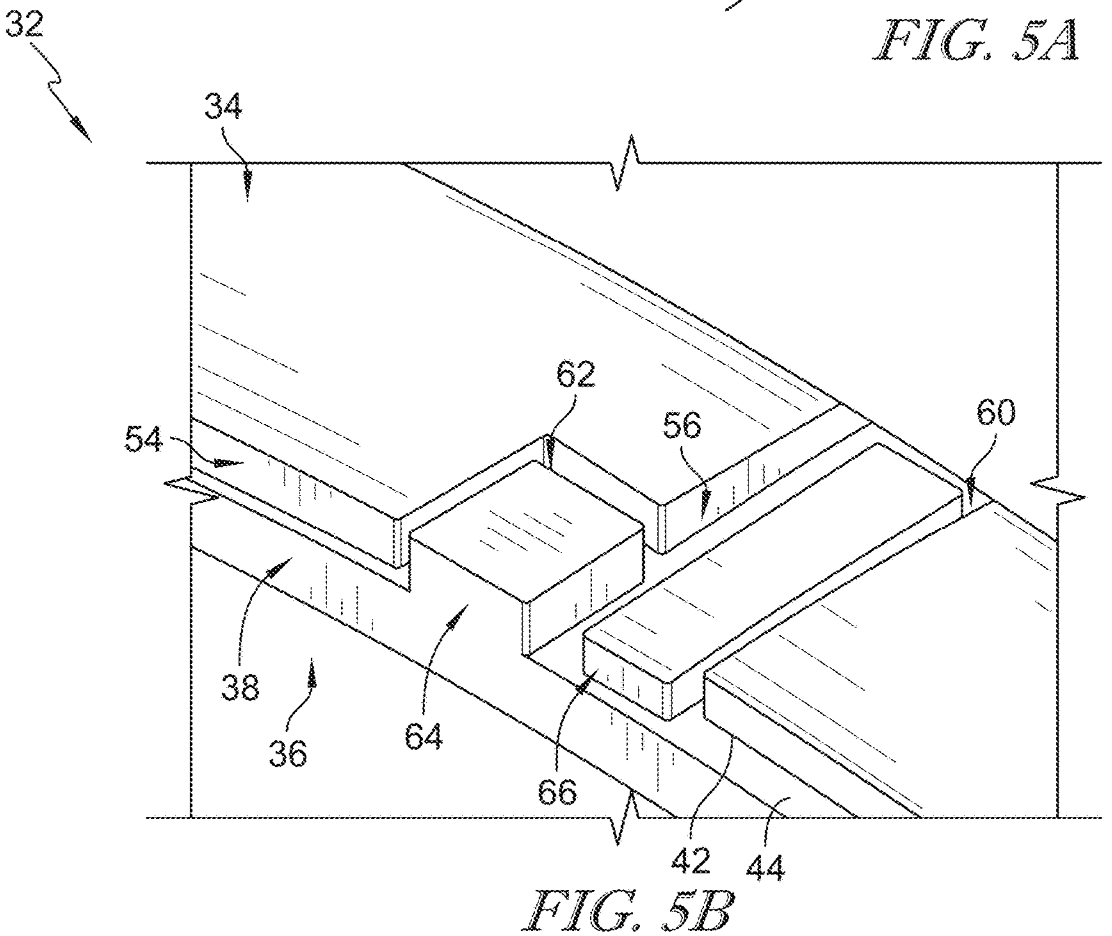
FIG. 5B is a detailed view of the vane assembly of FIG. 5A.
Figure 6:
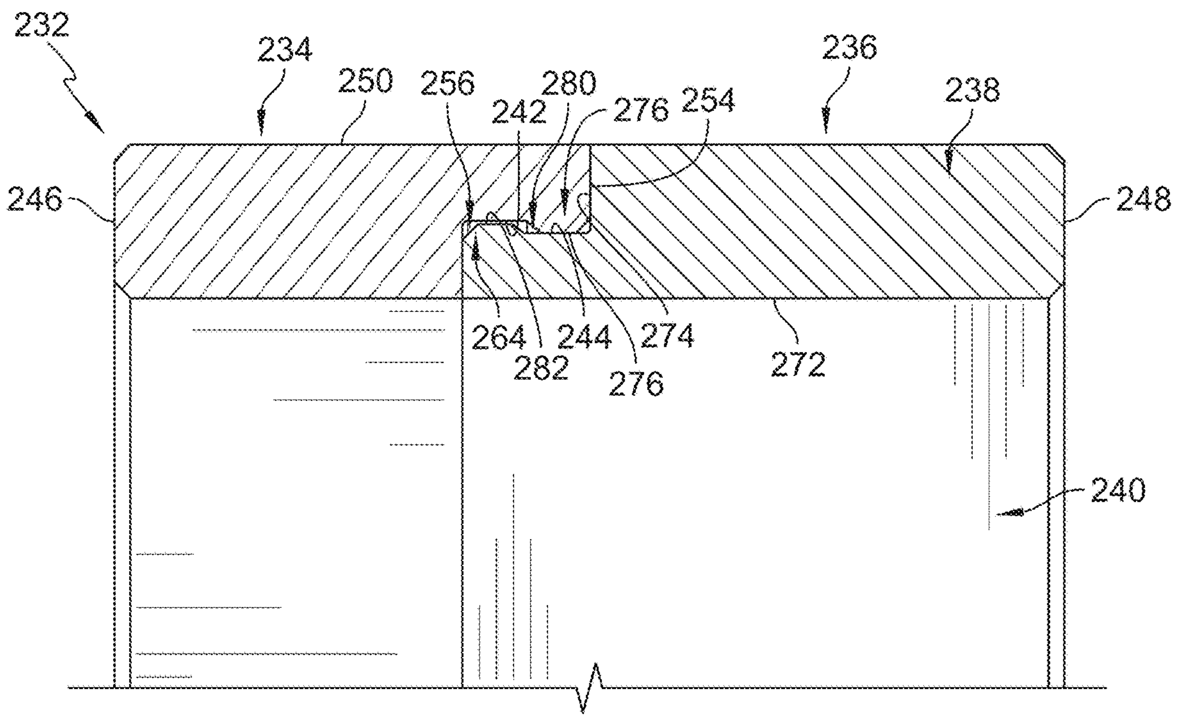
FIG. 6 is a section view of another embodiment of the vane assembly of FIG. 3.
Figure 7:
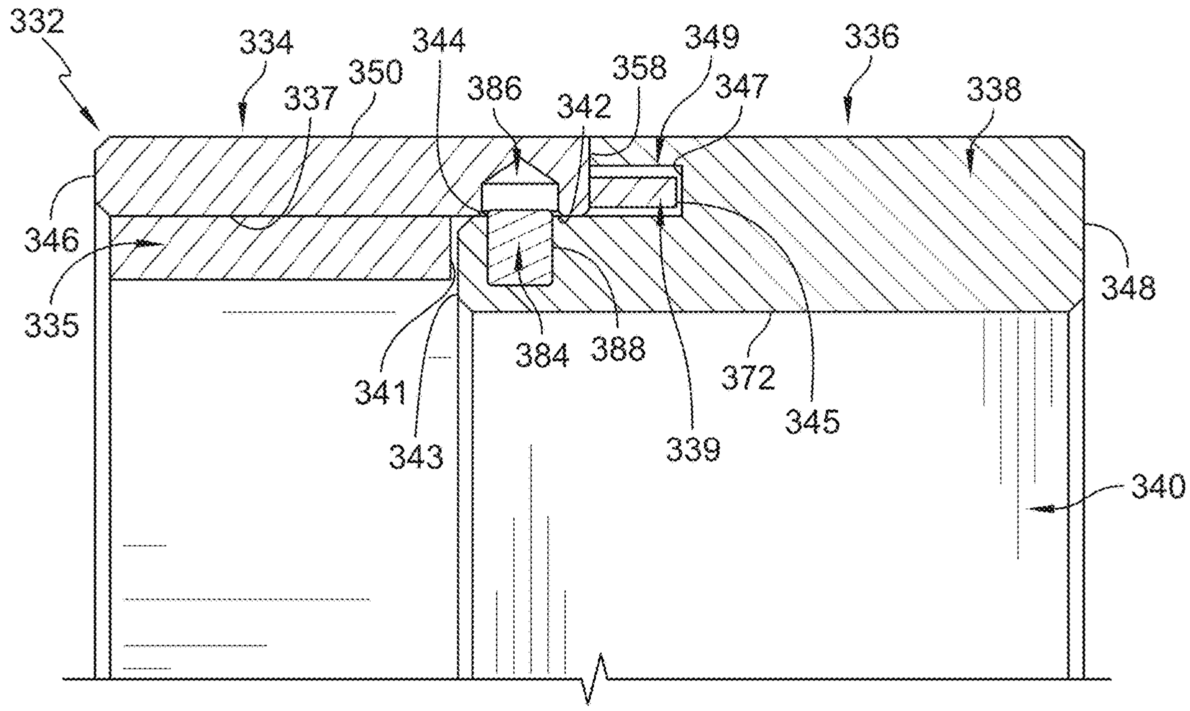
FIG. 7 is a section view of another embodiment of the vane assembly of FIG. 3.
Figure 8:
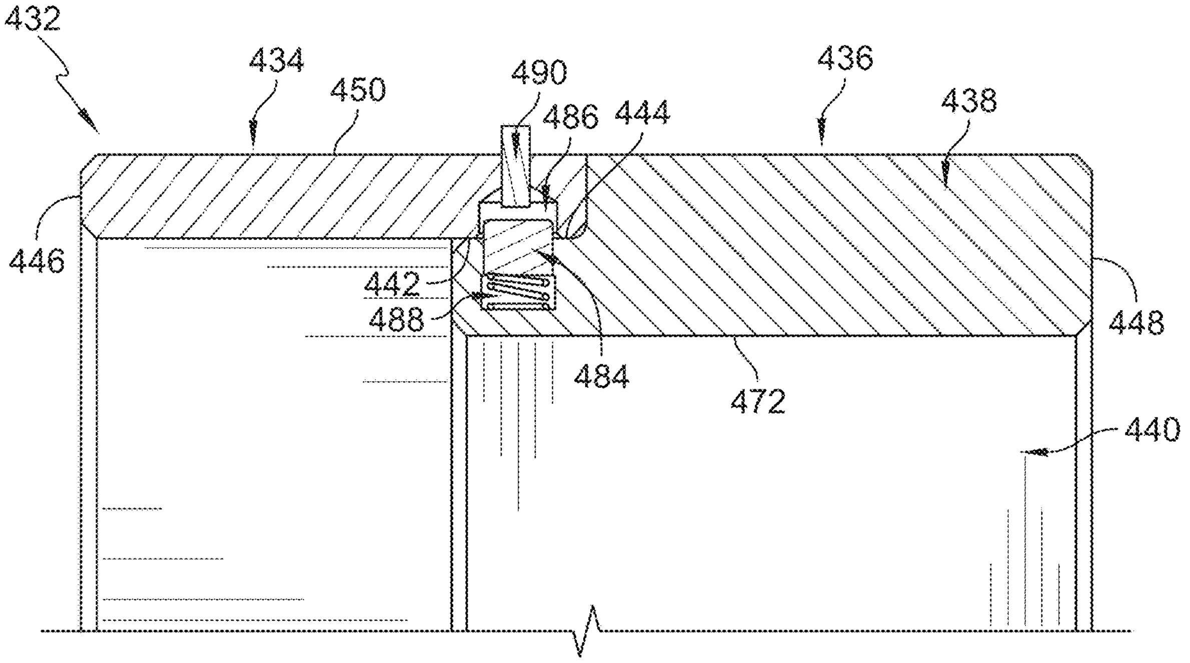
FIG. 8 is a section view of another embodiment of the vane assembly of FIG. 3.
Figure 9:
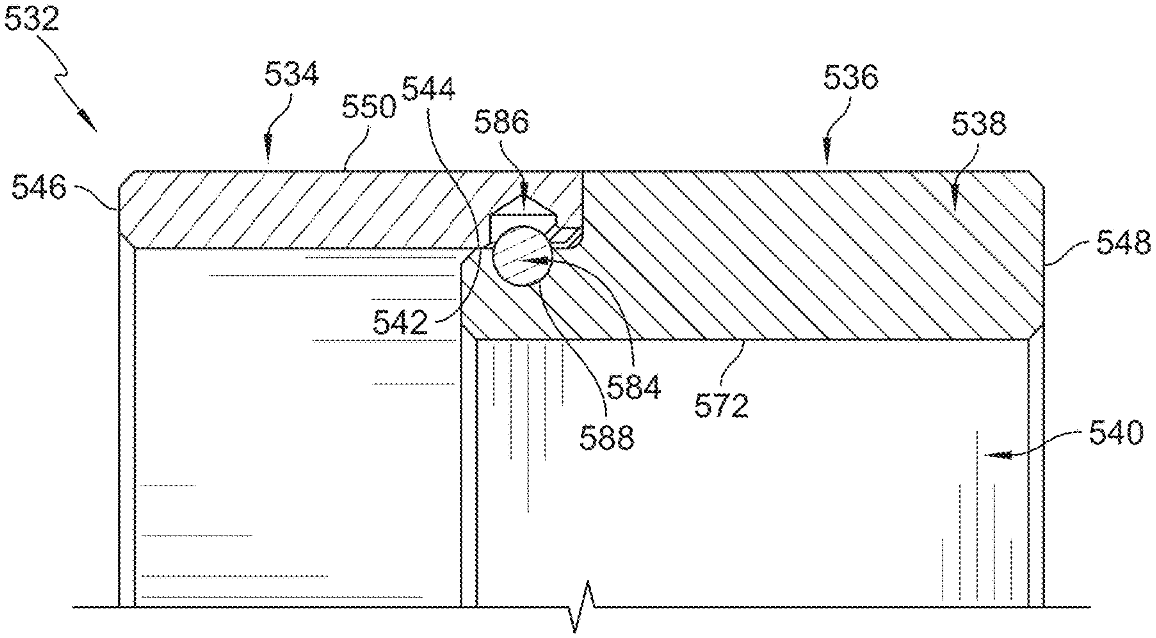
FIG. 9 is a section view of another embodiment of the vane assembly of FIG. 3.
Figure 10A:
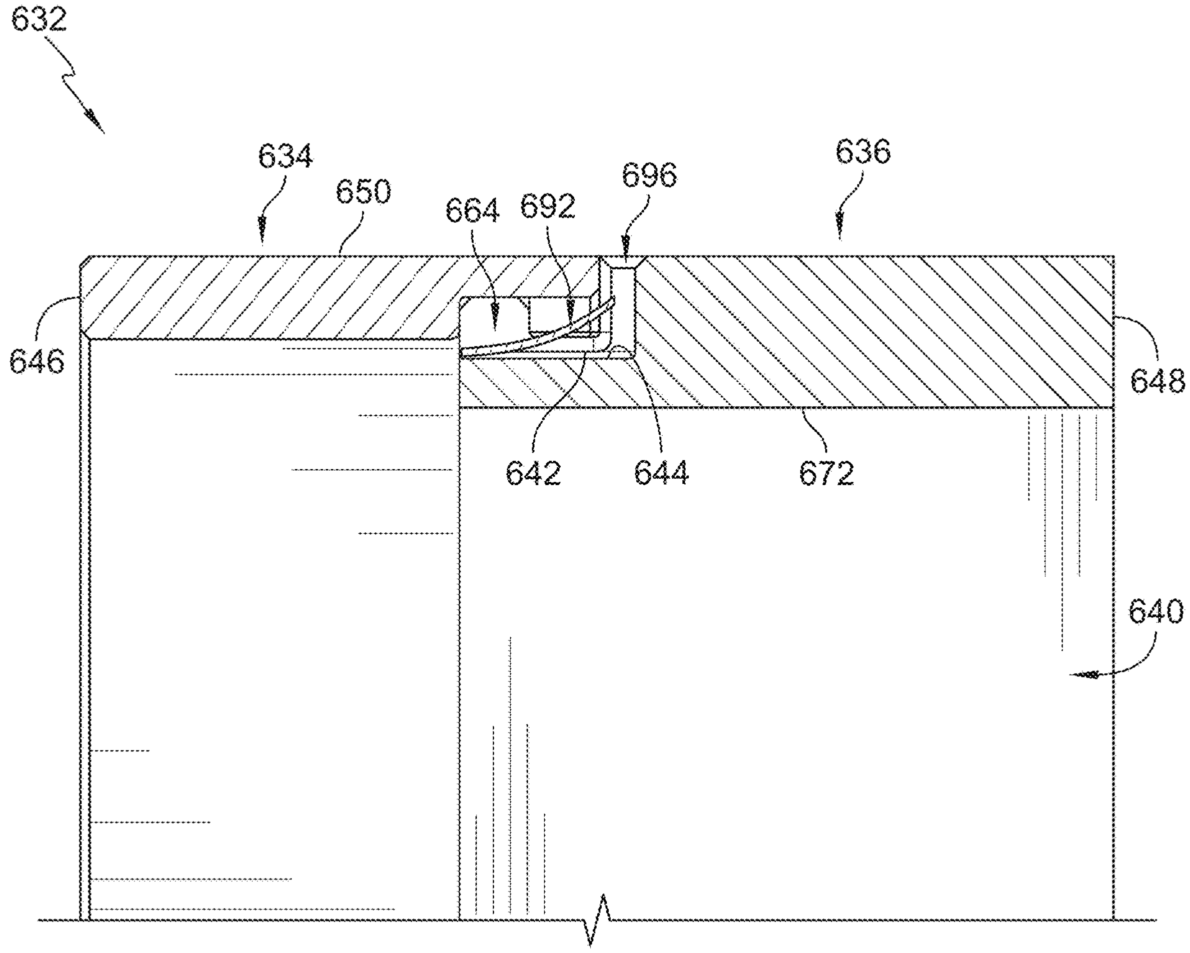
FIG. 10A is a section view of another embodiment of the vane assembly of FIG. 3.
Figure 10B:
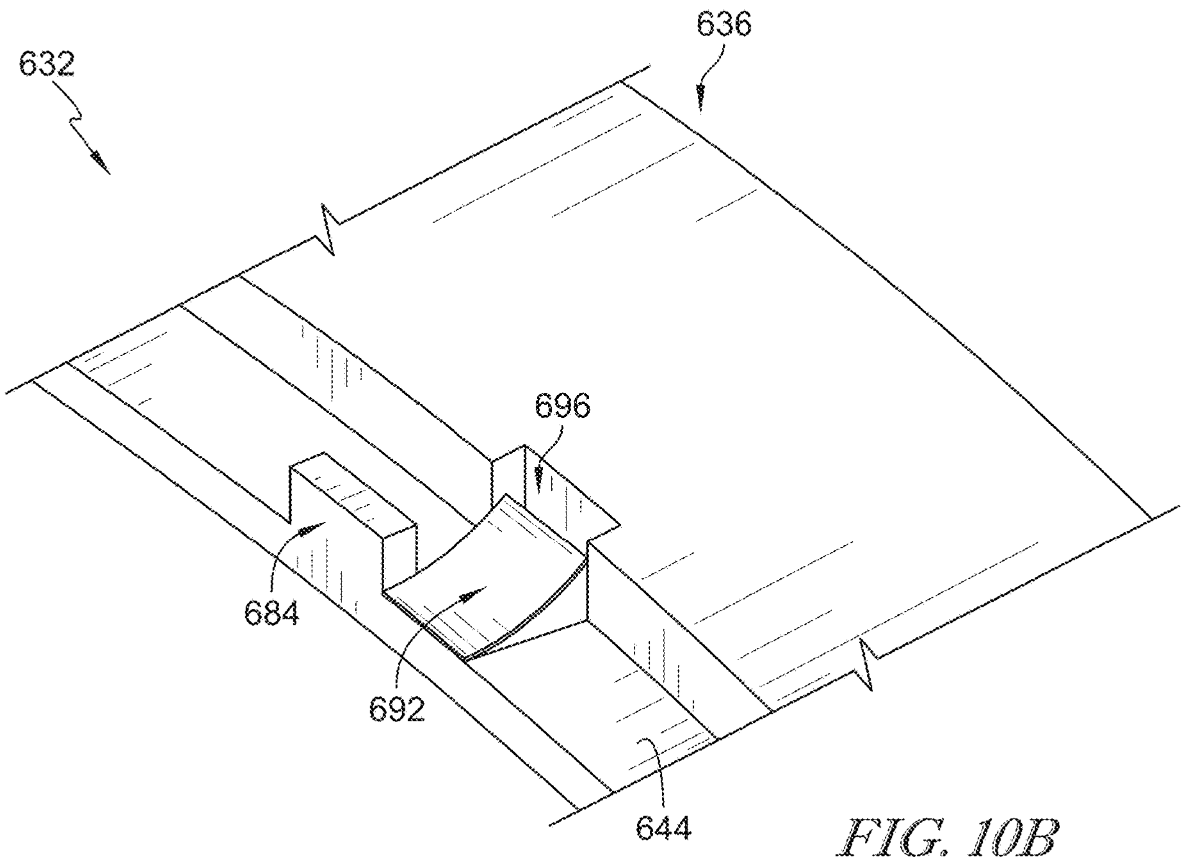
FIG. 10B is a detailed view of the vane assembly of FIG. 10A.
Figure 10C:
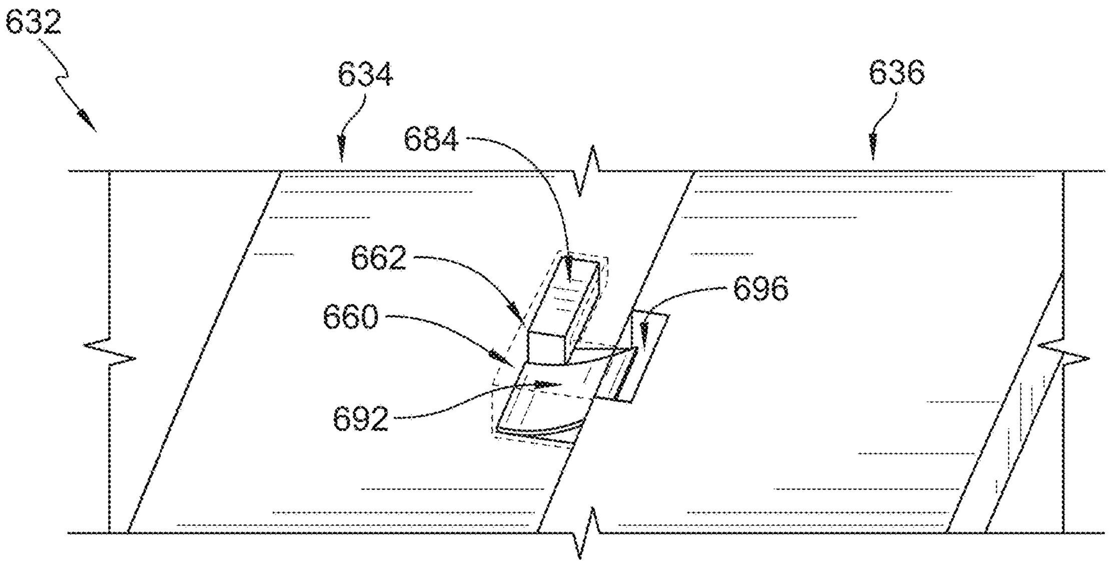
FIG. 10C is a detailed view of the vane assembly of FIG. 10A
Figure 11:
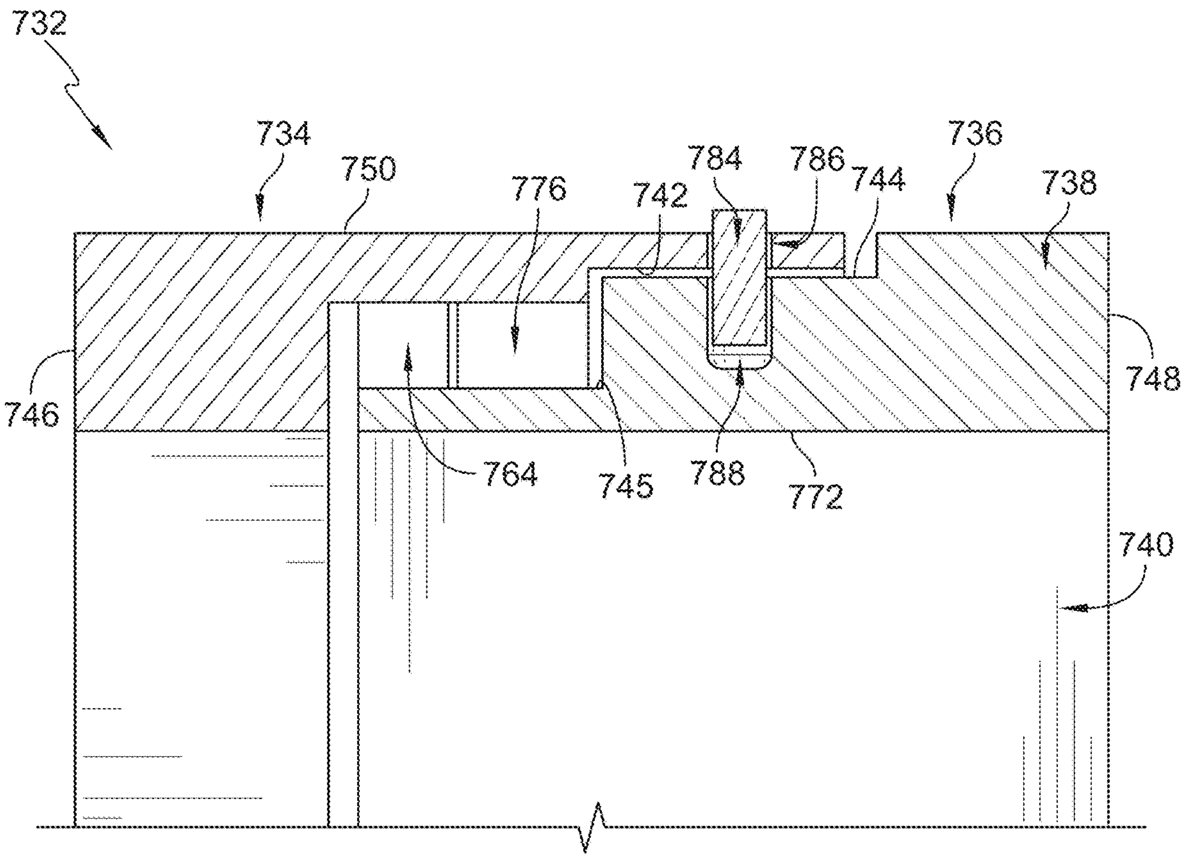
FIG. 11 is a section view of another embodiment of the vane assembly of FIG. 3.
Figure 12:
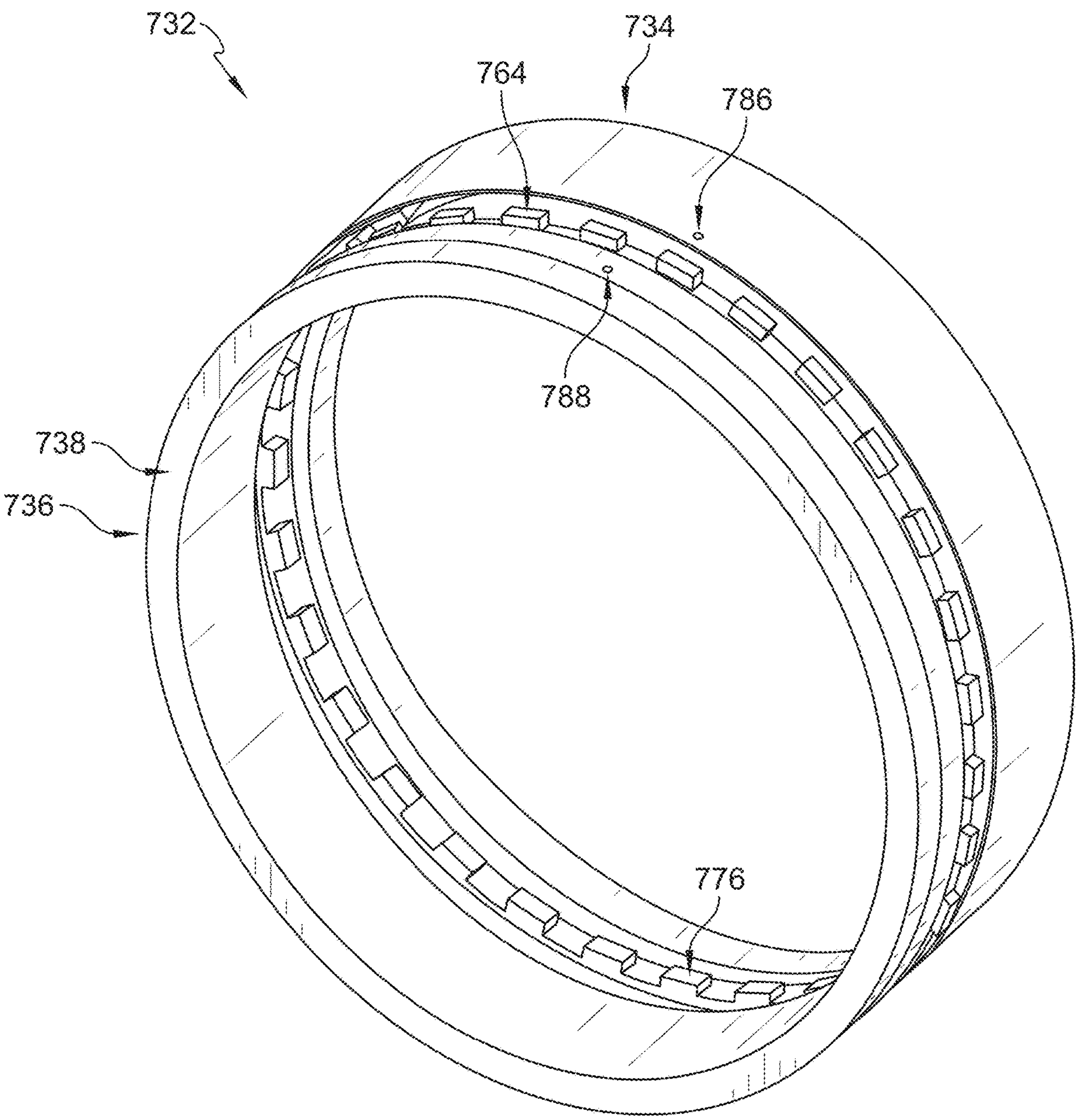
FIG. 12 is an exploded view of the vane assembly of FIG. 11.

A first embodiment of the vane assembly 32 of the present disclosure is shown in FIGS. 4-5B. A second embodiment of the vane assembly 232 of the present disclosure is shown in FIG. 6. A third embodiment of the vane assembly 332 of the present disclosure is shown in FIG. 7. A fourth embodiment of the vane assembly 432 of the present disclosure is shown in FIG. 8. A fifth embodiment of the vane assembly 532 of the present disclosure is shown in FIG. 9. A sixth embodiment of the vane assembly 632 of the present disclosure is shown in FIGS. 10A-10C. A seventh embodiment of the vane assembly 732 of the present disclosure is shown in FIGS. 11-12.

The vane assembly 32 includes the first vane segment 34 and the second vane segment 36 coupled to the first vane segment 34 as shown in FIG. 4 The second vane segment 36 includes a band 38 that extends circumferentially about the axis 11 and a plurality of vanes 40 coupled to the band 38 and extending radially inward from the band 38. In other embodiments, the plurality of vanes 40 extend radially outward from the band 38. A radially-inward surface 42 of the first vane segment 34 is mated with a radially-outward surface 44 of the band 38. As such, the plurality of vanes 40 are placed in a position to lie between an axially-forward surface 46 of the first vane segment 34 and an axially-aft surface 48 of the band 38 so that the first vane segment 34 and the second vane segment 36 are damped.

The first vane segment 34 and the second vane segment 36 may be a plurality of vane segments 34, 36 forming a full circle circumferentially around the axis 11. In such embodiments, the band 38 of each second vane segment 36 may extend circumferentially between a first end 68 and a second end 70 as shown in FIG. 2. An internal angle between the first end 68 and the second end 70 may be between about 60° and about 180°. In some embodiments, the internal angle may be less than about 60° or greater than about 180°. In some embodiments, the internal angle may be about 60°. In some embodiments, the internal angle may be about 90°. In some embodiments, the internal angle may be about 180°. In other embodiments, each first vane segment 34 may also extend circumferentially between a first end and a second end with an internal angle between about 60° and about 180°. The internal angle of each first vane segment 34 may be the same, greater than, or less than the internal angle of each band 38. This allows the vane assembly 32 to be assembled in fewer components, such as two 180° sectors for each vane segment 34, 36. This would also allow the vane assembly 32 to be installed axially as opposed to circumferentially in smaller sectors.

The first vane segment 34 includes a radially-outward surface 50, the radially-inward surface 42, and a radially-extending wall 54 extending radially between the radially-outward surface 50 and the radially-inward surface 42 as shown in FIGS. 4-5B. The radially-extending wall 54 is formed to include an axially-extending slot 56 extending axially between the axially-forward surface 46 and an axially-aft surface 58 of the first vane segment 34. The axially-extending slot 56 opens into the axially-aft surface 58 and the radially-inward surface 42. The axially-extending slot 56 is includes a guide path 60 and a circumferentially-offset notch 62 located circumferentially from the guide path 60.

The band 38 of the second vane segment 36 includes a tab 64 coupled to the radially-outward surface 44 and extending radially outward from the radially-outward surface 44. To couple the first vane segment 34 and the second vane segment 36, the tab 64 is inserted into the guide path 60 at the axially-aft surface 58 of the first vane segment 34. One of the first vane segment 34 and the second vane segment 36 is rotated circumferentially so that the tab 64 is received in the circumferentially-offset notch 62. A securing member 66 is then inserted into the guide path 60 to block circumferential movement of the first vane segment 34 relative to the second vane segment 36. The tab 64 is sized such that minimal radial and axial movement is permitted to provide damping between the first vane segment 34 and the second vane segment 36. The securing member 66 may be a fastener, a bolt, a screw, a rivet, a shim, a band, a tie, or any other device which may be used to be inserted into the guide path 60 to block circumferential movement of the first vane segment 34 relative to the second vane segment 36.

In some embodiments, the first vane segment 34 may include a second band (not shown) and a second plurality of vanes (not shown) coupled to the second band and extending radially from the second band.

Another embodiment of a vane assembly 232 in accordance with the present disclosure is shown in FIG. 6. The vane assembly 232 is substantially similar to the vane assembly 32 shown in FIGS. 1-5B and described herein. Accordingly, similar reference numbers in the 200 series indicate features that are common between the vane assembly 32 and the vane assembly 232. The description of the vane assembly 32 is incorporated by reference to apply with the vane assembly 232, except in instances when it conflicts with the specific description and the drawings of the vane assembly 232.

The vane assembly 232 includes a first vane segment 234 and a second vane segment 236 as shown in FIG. 6. The first vane segment 234 includes a radially-outward surface 250 and a radially-inward surface 242. A tab 276 is coupled to the radially-inward surface 242 and extends radially inward from the radially-inward surface 242. The tab 276 is formed to include a slot 256 extending radially from a radially-inward surface 278 of the tab 276 towards the radially-inward surface 242.

The second vane segment 236 includes a band 238 and a plurality of vanes 240 coupled to the band 238. The band 238 includes a radially-inward surface 272, a radially-outward surface 244, and a radially-extending wall 274 extending radially between the radially-inward surface 272 and the radially-outward surface 244. A tab 264 is coupled to the radially-outward surface 244 and extends radially outward from the radially-outward surface 244. The tab 264 is formed to include a slot 280 extending radially from a radially-outward surface 282 of the tab 264 towards the radially-outward surface 244.

The tab 276 of the first vane segment 234 is received in the slot 280 of the second vane segment 236 such that the radially-inward surface 278 of the tab 276 engages the radially-outward surface 244. Similarly, the tab 264 of the second vane segment 236 is received in the slot 256 of the first vane segment 234 such that the radially-outward surface 282 of the tab 264 engages the radially-inward surface 242. To assemble, the first vane segment 234 is heated so that the tab 276 slides over the tab 264. Once cooled, some radial clearance between the surfaces is permitted while axial and circumferential movement is prevented.

Another embodiment of a vane assembly 332 in accordance with the present disclosure is shown in FIG. 7. The vane assembly 332 is substantially similar to the vane assemblies 32, 232 shown in FIGS. 1-6 and described herein. Accordingly, similar reference numbers in the 300 series indicate features that are common between the vane assemblies 32, 232 and the vane assembly 332. The description of the vane assemblies 32, 232 is incorporated by reference to apply with the vane assembly 332, except in instances when it conflicts with the specific description and the drawings of the vane assembly 332.

The vane assembly 332 further includes a radially-extending pin 384 received in a first pin slot 386 formed in the first vane segment 334 and a second pin slot 388 formed in the band 338 of the second vane segment 336 as shown in FIG. 7. The radially-extending pin 384 provides tangential fixity. The first pin slot 386 opens into and extends radially outward from the radially-inward surface 342 of the first vane segment 334 towards the radially-outward surface 350. The second pin slot 388 opens into and extends radially inward from the radially-outward surface 344 of the band 338 towards the radially-inward surface 372. The radially-extending pin 384 is taller than a radial height of at least one of the first pin slot 386 and the second pin slot 388. The radially-inward surface 342 engages the radially-outward surface 344. The vane assembly 332 may further include the tabs and slots at other circumferential locations as disclosed for vane assemblies 32 and/or 232.

As shown in FIG. 7, the first vane segment 334 further includes a radially-extending restraint 335 coupled to a second radially-inward surface 337 of the first vane segment 334 and an axially-extending restraint 339 coupled to an axially-aft surface 358 of the first vane segment 334. The restraints 335, 339 are configured to limit axially-forward movement of the second vane segment 336. The first vane segment 334 may include more than one of each of the restraints 335, 339 spaced apart circumferentially. In some embodiments, the first vane segment 334 may include only the radially-extending restraint 335 or only the axially-extending restraint 339.

The radially-extending restraint 335 extends axially partially between an axially-forward surface 346 and the axially-aft surface 358 of the first vane segment 334. The radially-extending restraint 335 extends radially such that the second vane segment 336 is blocked from moving to a position forward of a lower axially-aft surface 341 of the radially-extending restraint 335 when the lower axially-aft surface 341 engages an axially-forward surface 343 of the band 338.

Similarly, the axially-extending restraint 339 is received in a slot 349 formed in the band 338 of the second vane segment 336. The axially-extending restraint 339 extends axially such that an upper axially-forward surface 345 of the band 338 is blocked from moving to a position forward of an axially-aft surface 347 of the axially-extending restraint 339 when the upper axially-aft surface 347 engages the axially-forward surface 345 of the band 338.

Another embodiment of a vane assembly 432 in accordance with the present disclosure is shown in FIG. 8. The vane assembly 432 is substantially similar to the vane assemblies 32, 232, 332 shown in FIGS. 1-7 and described herein. Accordingly, similar reference numbers in the 400 series indicate features that are common between the vane assemblies 32, 232, 332 and the vane assembly 432. The description of the vane assemblies 32, 232, 332 is incorporated by reference to apply with the vane assembly 432, except in instances when it conflicts with the specific description and the drawings of the vane assembly 432.

The vane assembly 432 further includes a spring-loaded pin 484 received in a first pin slot 486 formed in the first vane segment 434 and a second pin slot 488 formed in the band 438 of the second vane segment 436. The spring-loaded pin 484 provides tangential fixity as shown in FIG. 8. The first pin slot 486 opens into and extends radially outward from the radially-inward surface 442 of the first vane segment 434 through the radially-outward surface 450. The second pin slot 488 opens into and extends radially inward from the radially-outward surface 444 of the band 438 towards the radially-inward surface 472. The spring-loaded pin 484, when the spring is extended, is taller than a radial height of at least one of the first pin slot 486 and the second pin slot 488. A pin-release 490 is inserted into the first pin slot 486 through the radially-outward surface 450 to depress the spring-loaded pin 484 to disassemble the vane assembly 432. The spring-loaded pin 484 may be depressed into the second pin slot 488 with the pin-release 490 so that the entire spring-loaded pin 484 is radially inward from the radially-outward surface 444. The radially-inward surface 442 engages the radially-outward surface 444. The vane assembly 432 may further include the tabs and slots at other circumferential locations as disclosed for vane assemblies 32 and/or 232. The vane assembly 432 may also include the restraints as disclosed for vane assembly 332.

Another embodiment of a vane assembly 532 in accordance with the present disclosure is shown in FIG. 9. The vane assembly 532 is substantially similar to the vane assemblies 32, 232, 332, 432 shown in FIGS. 1-8 and described herein. Accordingly, similar reference numbers in the 500 series indicate features that are common between the vane assemblies 32, 232, 332, 432 and the vane assembly 532. The description of the vane assemblies 32, 232, 332, 432 is incorporated by reference to apply with the vane assembly 532, except in instances when it conflicts with the specific description and the drawings of the vane assembly 532.

The vane assembly 532 further includes a ball 584 received in a first slot 586 formed in the first vane segment 534 and a second slot 588 formed in the band 538 of the second vane segment 536 as shown in FIG. 9. The ball 584 provides circumferential retention between the first vane segment 534 and the second vane segment 536. The radially-inward surface 542 engages the radially-outward surface 544. The vane assembly 532 may further include tabs and slots at other circumferential locations as disclosed for vane assemblies 32, 232 to provide axial retention. The vane assembly 532 may also include the restraints as disclosed for vane assembly 332.

Another embodiment of a vane assembly 632 in accordance with the present disclosure is shown in FIGS. 10A-10C. The vane assembly 632 is substantially similar to the vane assemblies 32, 232, 332, 432, 532 shown in FIGS. 1-9 and described herein. Accordingly, similar reference numbers in the 600 series indicate features that are common between the vane assemblies 32, 232, 332, 432, 532 and the vane assembly 632. The description of the vane assemblies 32, 232, 332, 432, 532 is incorporated by reference to apply with the vane assembly 632, except in instances when it conflicts with the specific description and the drawings of the vane assembly 632.

The second vane segment 636 further includes a spring-release 692 coupled to the band 238 as shown in FIGS. 10A-10C. A second radially-outward surface 694 of the band 238 is formed to include a release slot 696. When assembled, the spring-release 692 is received in the guide path 660 while the tab 664 is received in the circumferentially-offset notch 662. The spring-release 692 may be depressed via the release slot 696 to disassemble the vane assembly 632. The vane assembly 632 may further include pins or balls at other circumferential locations as disclosed for vane assemblies 332, 432, 532 to provide axial retention.

Another embodiment of a vane assembly 732 in accordance with the present disclosure is shown in FIGS. 11-12. The vane assembly 732 is substantially similar to the vane assemblies 32, 232, 332, 432, 532, 632 shown in FIGS. 1-10C and described herein. Accordingly, similar reference numbers in the 700 series indicate features that are common between the vane assemblies 32, 232, 332, 432, 532, 632 and the vane assembly 732. The description of the vane assemblies 32, 232, 332, 432, 532, 632 is incorporated by reference to apply with the vane assembly 732, except in instances when it conflicts with the specific description and the drawings of the vane assembly 732.

The vane assembly 732 includes a first vane segment 734 and a second vane segment 736 as shown in FIGS. 11-12. The first vane segment 734 includes a radially-outward surface 750, a radially-inward surface 742, and a plurality of tabs 776 extending radially inward from the radially-inward surface 742.

The second vane segment 736 includes a band 738 and a plurality of vanes 740 coupled to the band 738. The band 738 includes a radially-inward surface 772, a first radially-outward surface 744, a second radially-outward surface 745, and a plurality of tabs 764 extending radially outward from the radially-outward surface 745.

The plurality of tabs 764 are circumferentially offset from the plurality of tabs 776 so that each of the plurality of tabs 764 can be fed between two of the plurality of tabs 776. To assemble, the second vane segment 236 is rotated circumferentially so that the plurality of tabs 764 are axially forward of the plurality of tabs 776. Accordingly, the radially inward surface 742 engages the radially-outward surface 744.

The vane assembly 732 further includes a radially-extending pin 784 received in a first pin slot 786 formed in the first vane segment 734 and a second pin slot 788 formed in the band 738 of the second vane segment 736. The radially-extending pin 784 locks the first vane segment 734 to the second vane segment 736. The first pin slot 786 opens into and extends radially outward from the radially-inward surface 742 through the radially-outward surface 750. The second pin slot 788 opens into and extends radially inward from the radially-outward surface 744 of the band 738 towards the radially-inward surface 772. The radially-extending pin 784 is taller than a radial height of at least one of the first pin slot 786 and the second pin slot 788. The pin 784 may alternatively be a rivet, a screw, or another fastener as known in the art.

Fan assemblies 12 and compressors 24 typically have stator vanes ahead of, between, or aft of rotating blades. It is desired for these stator vanes to have some damping enabled by small gaps and not being overly constrained to avoid high stresses. The vanes also cannot be too loose so as to interfere with rotating parts or have other issues. Current solutions come with high complexity and cost along with slow assembly times.

The vane assembly 32, 232, 332, 432, 532, 632, 732 of the present disclosure utilizes stator vanes or abradable treatments with overlapping flanges having features which provide loose fixity to provide limited movement of the stator vanes but adequate damping. Such features may include two vane segments with interlocking lip features that have milled slots between for assembly, a milled slot and a tab, a depression or hole and a ball or pin, or other similar means.

Such features enables sealing of the vane assembly for air flow discouragement without overly constraining or stressing the parts.

The vane assembly 32, 232, 332, 432, 532, 632, 732 of the present disclosure also provides a variety of manufacturing options. Traditional vane assemblies use machined singlets, doublets, or triplets and complex inner shrouds, for example, for outlet guide vanes or other components of the gas turbine engine which require vane assemblies.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A vane assembly adapted for a gas turbine engine, the vane assembly comprising a first vane segment that extends circumferentially about an axis, and a second vane segment having a band that extends circumferentially about the axis and a plurality of vanes coupled to the band and extending radially from the band, wherein the first vane segment is coupled to the second vane segment, at least a portion of a radially-outward surface of the band of the second vane segment in contact with at least a portion of a radially-inward surface of the first vane segment at an axially aft most portion of the first vane segment and an axially forward most portion of the second vane segment to mate the first vane segment with the second vane segment and to place the plurality of vanes of the second vane segment in a position to lie between an axially-forward surface of the first vane segment and an axially-aft surface of the band of the second vane segment so that the first vane segment and the second vane segment are damped.

2. The vane assembly of claim 1, wherein movement of the band relative to the first vane segment is blocked in at least one of an axial, radial, or circumferential direction while minimal movement of the band relative to the first vane segment is permitted in at least one of an axial, radial, or circumferential direction.

3. The vane assembly of claim 1, wherein the one or more vanes extend radially inward from the vane segment.

4. The vane assembly of claim 1, wherein the one or more vanes extend radially outward from the vane segment.

5. The vane assembly of claim 1, wherein the band extends circumferentially between a first end and a second end, and an internal angle between the first end and the second end is between about 60° and about 180°.

6. The vane assembly of claim 1, wherein the first vane segment includes a second band and a second plurality of vanes coupled to the second band and extending radially from the second band.

7. The vane assembly of claim 1, wherein the first vane segment is shaped to form an axially extending slot in the radially-inward surface of the first vane segment.

8. The vane assembly of claim 7, wherein the axially extending slot extends between an aft end and a forward end of an overlapping section of the first vane segment and the second vane segment.

9. The vane assembly of claim 7, wherein the first vane segment is shaped to form a circumferentially extending slot in the radially-inward surface of the first vane segment, the circumferentially extending slot connected to the axially extending slot at a forward most end of the axially extending slot.

10. The vane assembly of claim 9, wherein the second vane segment is shaped to form a tab protruding from the radially-outward surface of the second vane segment.

11. The vane assembly of claim 10, wherein the tab is shaped to fit within the axially extending slot and the circumferentially extending slot of the first vane segment.

12. The vane assembly of claim 10, wherein the tab of the second vane segment is disposed within the circumferentially extending slot of the first vane segment, circumferentially offset from the axially extending slot, to couple the first vane segment to the second vane segment.

13. The vane assembly of claim 12, wherein the vane assembly further comprises a securing member configured to be inserted into the circumferentially extending slot to at least partially block circumferential rotation of the second vane segment relative to the first vane segment.

14. The vane assembly of claim 10, wherein the circumferentially extending slot and the tab are sized to allow minimal movement of the first vane segment and the second vane segment relative to each other to avoid high stresses within the vane assembly.

* * * * *